(12) United States Patent  
Ahlert et al.

(10) Patent No.: US 7,011,480 B2
(45) Date of Patent: Mar. 14, 2006

(54) DUNNAGE BAGS

(75) Inventors: Detlev Ahlert, Ottery (ZA); Bester Jacobus Pansegrouw, Ottery (ZA)

(73) Assignee: Stopak (Pty) Ltd, (ZA)

( * ) Notice: Subject to any disclaimer, the term of this patent is extended or adjusted under 35 U.S.C. 154(b) by 0 days.

(21) Appl. No.: 10/739,034

(22) Filed: Dec. 19, 2003

(65) Prior Publication Data

US 2004/0141824 A1 Jul. 22, 2004

(30) Foreign Application Priority Data

Jan. 21, 2003 (ZA) ................................ 2003/0547

(51) Int. Cl.
*B60P 7/08* (2006.01)
(52) U.S. Cl. ...................... 410/119; 410/125
(58) Field of Classification Search ............. 410/117, 410/118, 119, 125, 128, 155; 206/522; 383/25, 383/109, 113; 428/35.2
See application file for complete search history.

(56) References Cited

U.S. PATENT DOCUMENTS

| | | | | |
|---|---|---|---|---|
| 2,990,070 A | * | 6/1961 | Cushman ................. 410/119 |
| 3,028,981 A | * | 4/1962 | Ford et al. ............... 410/117 |
| 3,072,270 A | * | 1/1963 | Tolby et al. .............. 410/119 |
| 3,145,853 A | * | 8/1964 | Langenberg ............... 52/2.11 |
| 3,199,689 A | * | 8/1965 | Feldkamp ................. 410/119 |
| 3,442,402 A | * | 5/1969 | Baxter .................... 410/119 |
| 3,643,268 A | * | 2/1972 | Stamberger ................ 428/12 |
| 3,868,026 A | * | 2/1975 | Baxter .................... 410/119 |
| 4,116,344 A | * | 9/1978 | Ziemba ................... 410/119 |
| 5,868,534 A | * | 2/1999 | Goshorn et al. ........... 410/119 |
| 6,527,488 B1 | * | 3/2003 | Elze et al. ............... 410/119 |
| 2004/0141824 A1 | * | 7/2004 | Ahlert et al. ............. 410/119 |

* cited by examiner

Primary Examiner—Stephen Gordon
(74) Attorney, Agent, or Firm—Stites & Harbison PLLC; Marvin Petry

(57) ABSTRACT

A dunnage bag for securing loads is provided which includes an inflatable dunnage bag for 12 to 40 inch voids between load to be secured. The bag consists of a gastight polyethylene inflatable bladder provided with an inflation valve and a reinforcing sleeve made of at least one ply of a suitable material. The sleeve has a first opening and a second opening. The sleeve is folded to form at least one substantially rectangular end to close off at least one of the openings. At least 50% of an exterior surface area of the dunnage bag is in contact when placed between two loads to be secured or when placed between a support and a load to be secured.

13 Claims, 8 Drawing Sheets

DUNNAGE BAGS

FIELD OF INVENTION

The present invention relates to dunnage bags.

More particularly, the invention relates to inflatable dunnage bags.

BACKGROUND TO INVENTION

Conventional inflatable and disposable dunnage bags include a gastight bladder, usually constructed from polyethylene material, surrounded by an outer protective and supportive casing consisting of at least one ply of paper material. These dunnage bags are used to fill spaces between cargo or between the cargo and the walls of the freight carries in order to prevent the cargo from shifting and damaging either the cargo itself and/or the walls of the freight carrier. The dunnage bags are typically placed between the cargo in a deflated condition and are subsequently inflated with a gas. The is pressure of the gas in the dunnage bags is determined by the application, the size and wall composition of the dunnage bags.

It is an object of the invention to suggest a novel dunnage bag.

SUMMARY OF INVENTION

According to the invention, a dunnage bag for securing loads, includes
- (a) a gastight inflatable bladder; and
- (b) a reinforcing sleeve made of at least one material ply, the sleeve having a first opening and a second opening, and the sleeve being folded to form at least one substantially rectangular end to close off at least one of the openings.

Also according to the invention a dunnage bag for securing loads, includes an inflatable dunnage bag for 12 to 40 inch voids between load to be secured and consisting of
- (a) a gastight polyethylene inflatable bladder provided with ah inflation valve; and
- (b) a reinforcing sleeve made of at least one ply of paper, the sleeve having a first opening and a second opening, and the reinforcing sleeve being folded to form at least one substantially rectangular end to close off at least one of the openings;

and in which at least 50% of its exterior surface area is in contact with a load to be secured.

Yet further according to the invention, a method of securing load, includes the steps
- (a) of providing, in a 12 to 40 inch void between load to be secured, an inflatable dunnage bag consisting of a gastight polyethylene inflatable bladder, an inflation valve, and a reinforcing sleeve made of at least one ply of paper, the sleeve having a first opening and a second opening, and the reinforcing sleeve being folded to form at least one substantially rectangular end to close off at least one of the openings;
- (b) of inflating the inflatable dunnage bag such that at least 50% of the exterior surface area of the dunnage bag is in contact when placed between two loads to be secured or when placed between a support and a load to be secured.

The sleeve may be made of at least one material ply selected from the material group consisting of paper, plastics material, woven PP (polypropylene), HDPE (high-density polyethylene) and PVC (polyvinylchloride).

The rectangular end may consist of flaps formed by cutting the sleeve at the opening being closed.

The flaps at one end may be folded towards each other to close off the respective opening.

The flaps at one end may be glued to each other to permanently close off the respective opening.

The dunnage bag may be inflatable.

The dunnage bag may be provided with one to six plies of paper sleeves.

The inflatable bladder may be made of polyethylene.

The inflatable bladder may be provided with an inflation valve.

The inflation valve may protrude to the exterior at one of the openings.

The dunnage bag may be used in voids larger than 12 inches.

The void may be smaller than 40 inches.

The dunnage bag may be substantially rectangular in shape.

The dunnage bag may be disposable.

The dunnage bag may be applicable in conjunction with void fillers.

The dunnage bag may be applicable in conjunction with friction panels.

At least 50% of the exterior surface area of the dunnage bag may be adapted to be in contact between two loads or between a support and a load to be secured.

The contact may be direct.

The contact may be indirect.

BRIEF DESCRIPTION OF DRAWINGS

The invention will now be described by way of example with reference to the accompanying schematic drawings.

In the drawings there is shown in.

DETAILED DESCRIPTION OF DRAWINGS

Figure 1:
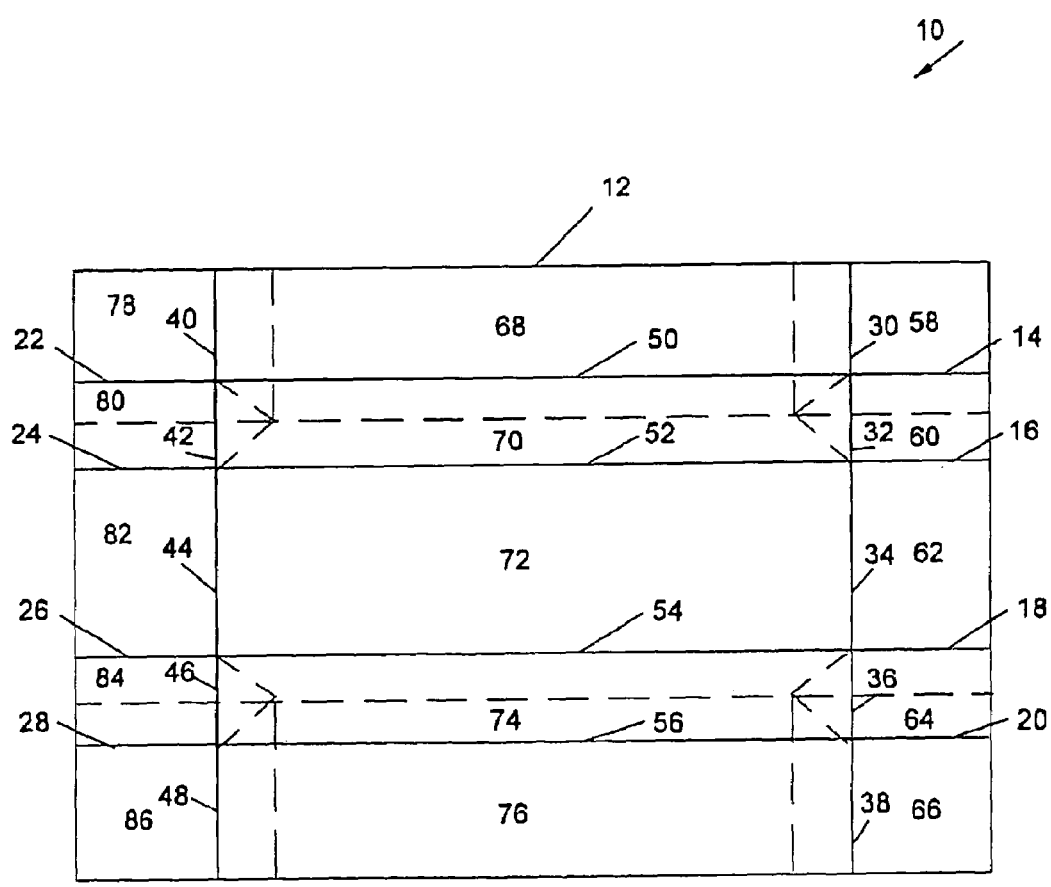
FIG. 1: a top view of a ply of paper for forming a paper sleeve of a dunnage bag in accordance with the invention.

Referring to FIGS. 1 to 9, a ply of paper, generally indicated by reference numeral 10, for forming a paper sleeve of a dunnage bag in accordance with the invention is shown.

The ply of paper 10 includes a paper sheet 12 having lacerations at cutting lines 14 to 28 and folding lines 30 to 56 so as to form rectangles 58 to 86. Rectangles 58 to 66 and 78 to 86 form so-called end-flaps.

Figure 2:
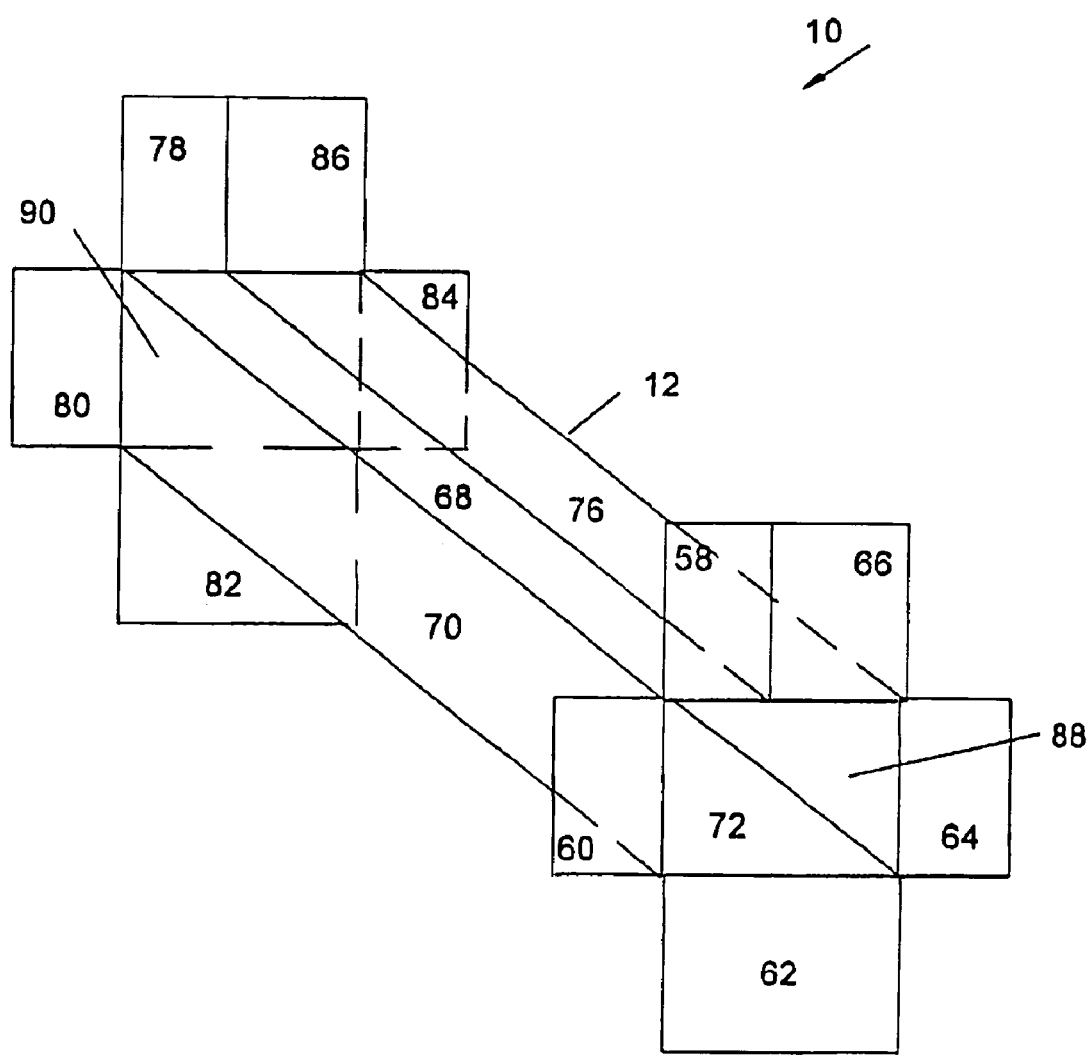
FIG. 2: a perspective view of the ply of paper shown in FIG. 1 but folded to form a paper sleeve.

In FIG. 2, the rectangles 68 and 76 are welded or glued together to form a paper sleeve out of the ply of paper 12. The ply of paper 10 thus has a first opening 88 and a second opening 90.

Figure 3:
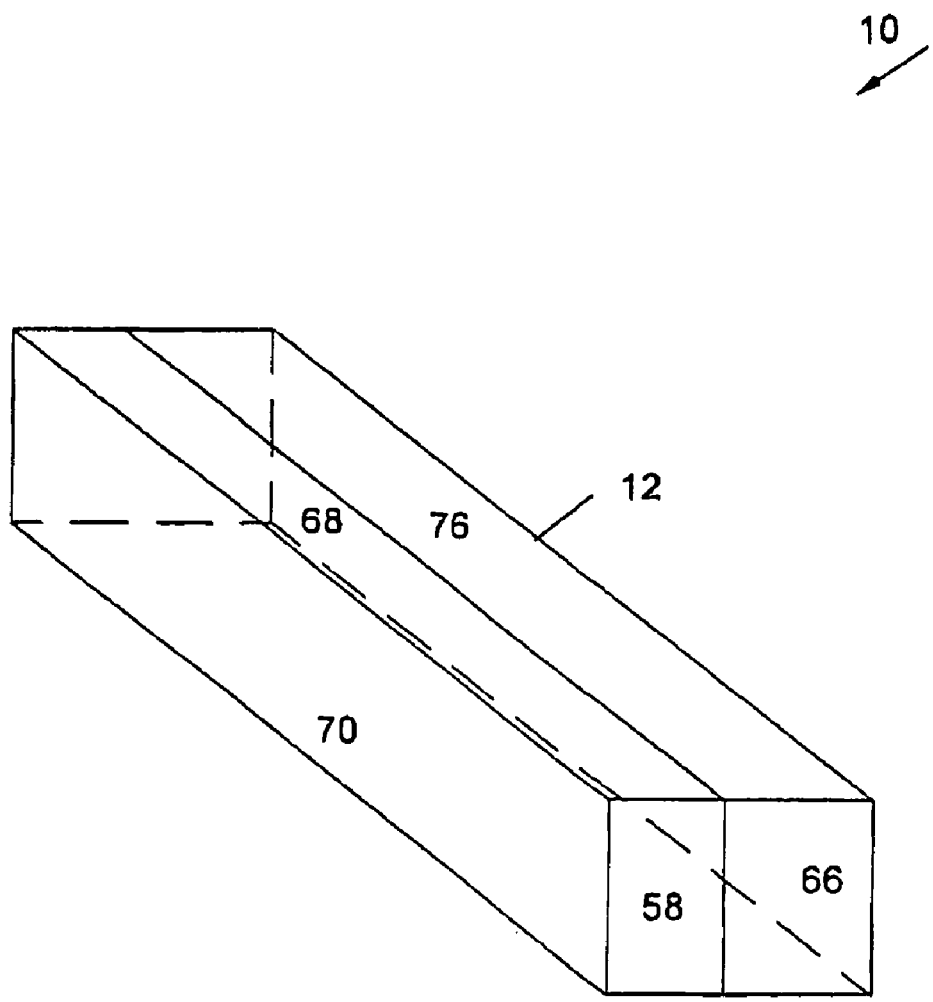
FIG. 3: a perspective view of the ply of paper shown in FIG. 2 with the end openings closed to form rectangular ends.

In FIG. 3, the rectangular end-flaps 58 to 66 are folded towards each other and glued together to close-off the first opening 88. The rectangular end-flaps 78 to 86 are folded towards each other and glued together to close-off the second opening 90.

Figure 4:
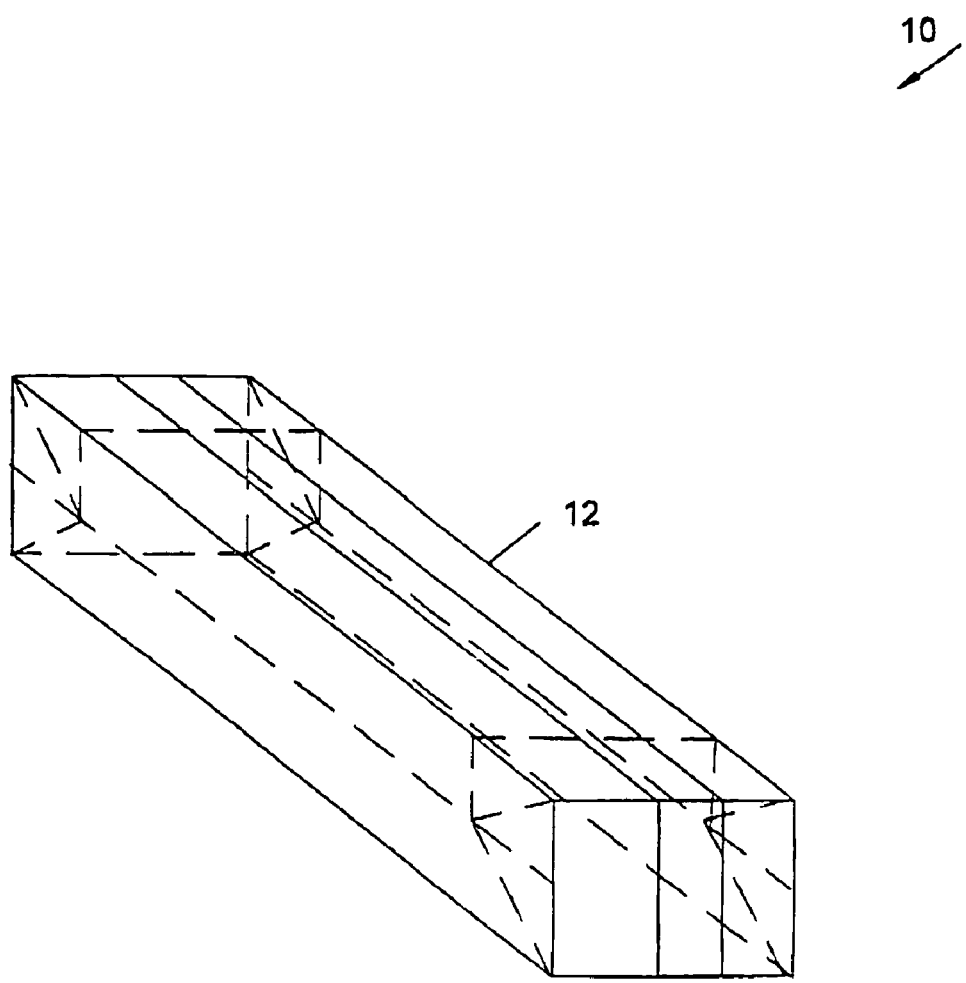
FIG. 4: a perspective view of the ply of paper shown in FIG. 3 in a more flattened position.

In FIG. 4, the ply of paper 10 is slightly flattened by means of the dotted folding lines.

Figure 5:
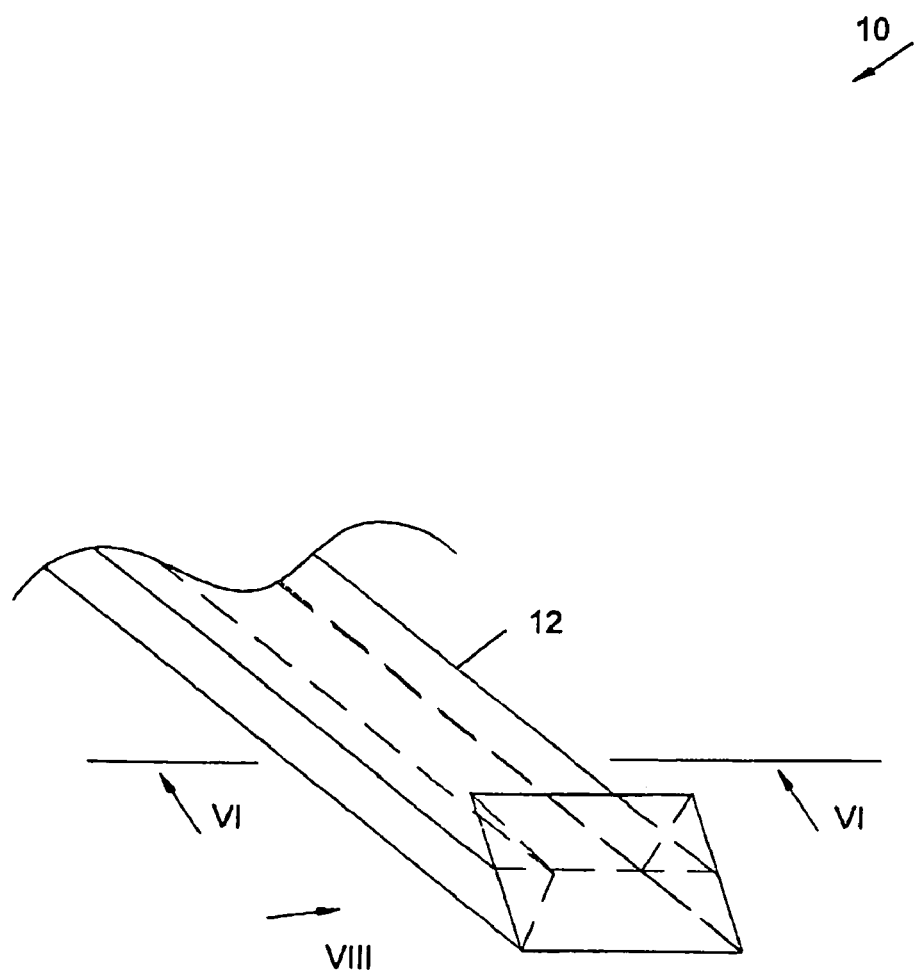
FIG. 5: a perspective view of the ply of paper shown in FIG. 4 with a rectangular end folded back.
Figure 6:
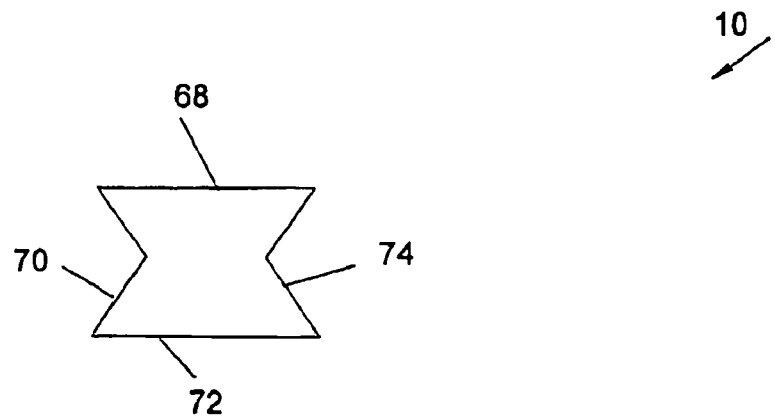
FIG. 6: a sectional view of the ply of paper seen along arrows VI—VI in FIG. 5.

In FIG. 5, the ply of paper 10 is further flattened in that the rectangular end-flaps 58 to 66, after being glued together, are folded back toward the second opening 90. Similarly the rectangular end-flaps 78 to 86, after being glued together, are folded back toward the first opening 88.

Figure 7:
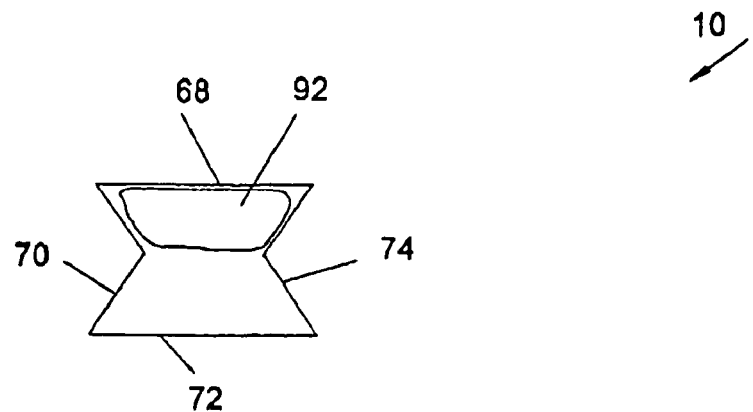
FIG. 7: a view of the ply of paper corresponding to FIG. 6 but provided with an inflatable bladder inside.
Figure 8:
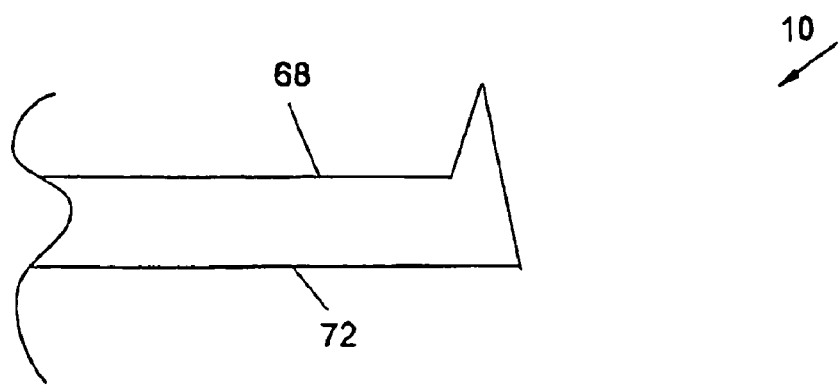
FIG. 8; a sectional view of the ply of paper seen along arrow VIII in FIG. 5.
Figure 9:
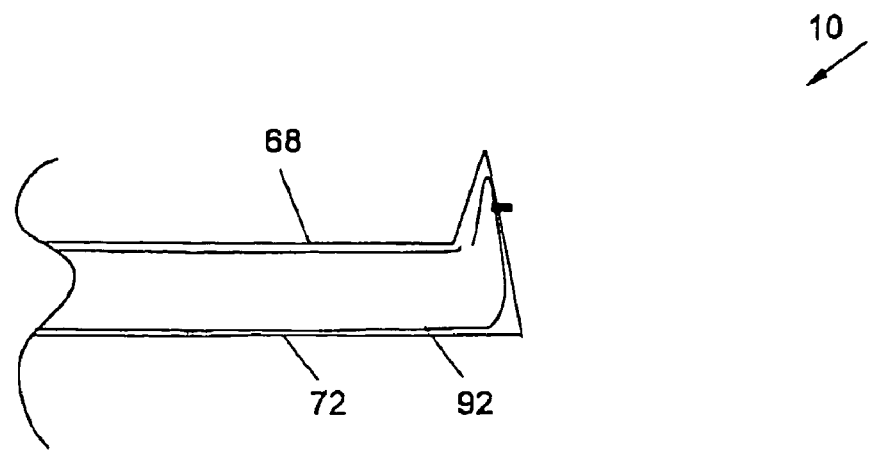
FIG. 9: a view of the ply of paper corresponding to FIG. 8 but provided with an inflatable bladder inside.

In FIGS. 7 and 9, the ply of paper 10 is provided with an inflatable bladder 92.

Figure 10:
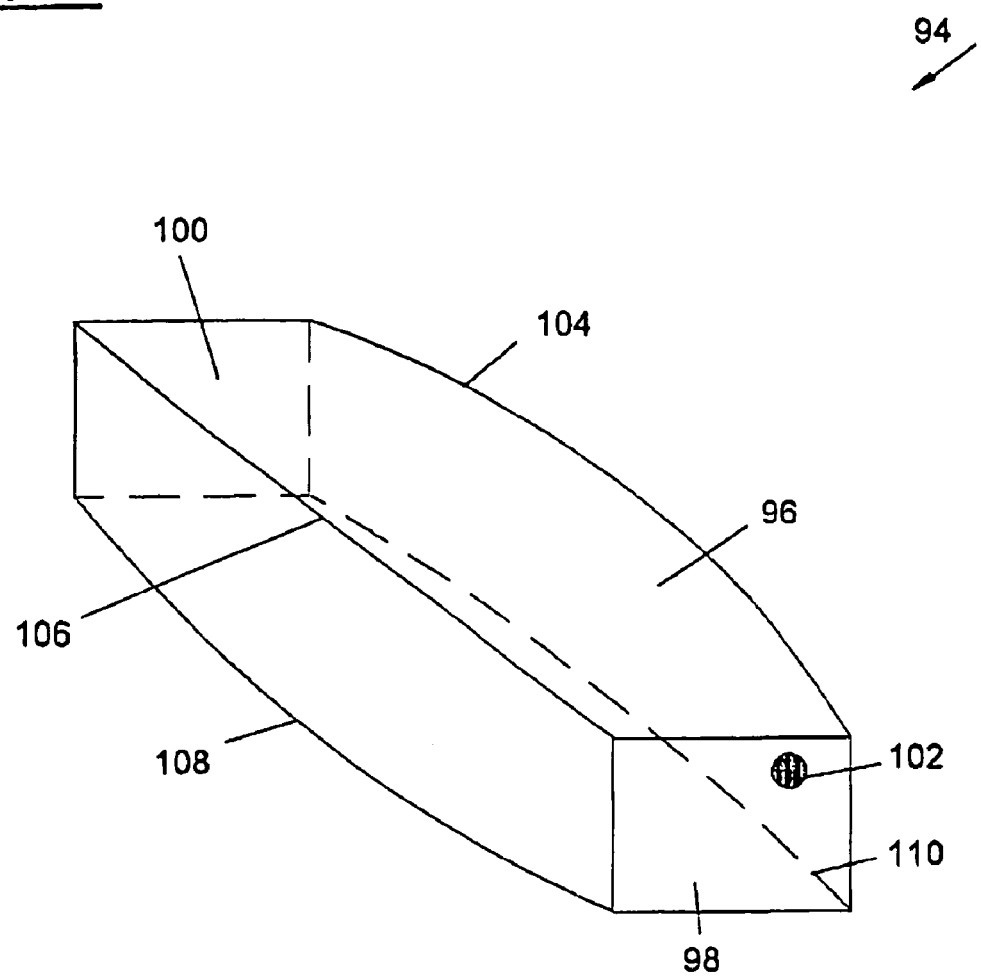
FIG. 10: a view of a dunnage bag corresponding to FIG. 3 but in an inflated position.

Referring to FIG. 10, a dunnage bag, generally indicated by reference numeral 94, in accordance with the invention is shown.

The dunnage bag 94 includes a ply of paper 96 folded according to the method shown in FIGS. 1 to 9. The dunnage bag 94 is provided with two rectangular ends, 98 and 100 respectively. The dunnage bag 94 is furthermore provided with an inflatable bladder (not shown) in the interior of the folded ply of paper 96 and an inflation valve 102 connected to the inflatable bladder (not shown) and protruding the rectangular end 98. Due to inflation of the inflatable bladder, edges 104 to 110 bulge slightly out.

In use, the dunnage bag 94 is typically placed between cargo in a deflated condition and Is subsequently inflated with a gas. The pressure of the gas in the dunnage bag 94 is determined by the application, the size and wall composition of the dunnage bag 94. The rectangular ends 98 and 100 reduce the load securing forces acting on the dunnage bag 94 due to the increased impact area of the rectangular ends 98 and 100 and the relative flat side of the dunnage bag 94 even in inflated position. In order to strengthen the reinforcement action of the dunnage bag 94, several plies of paper 96, such a six, may be provided.

The inflatable dunnage bag 94 is accordance with the invention is thus ideal for 12 to 40 inch voids between load to be secured as at least 50% of the exterior surface area of the dunnage bag 94 is in direct or indirect contact with the load to be secured. The indirect contact is applicable for when void fillers and friction panels are applied.

LIST OF REFERENCE NUMERALS

10 Ply of paper
12 Paper sheet
14–28 Cutting lines
30–56 Folding lines
58–86 Rectangles
58–66 Rectangular end-flaps
78–86 Rectangular end-flaps
88 First opening
90 Second opening
92 Inflatable bladder
94 Dunnage bag
96 Ply of paper
98 Rectangular end
100 Rectangular end
102 Inflation valve
104 Edge
106 Edge
108 Edge
110 Edge

What is claimed is:

1. An inflatable dunnage bag for securing loads, said bag comprising:
    (a) a gastight inflatable bladder; and
    (b) a reinforcing sleeve made of at least one material ply selected from the material group consisting of paper, plastics material, woven PP (polypropylene), HDPE (high-density polyethylene) and PVC (polyvinylchloride), the sleeve having a first opening and a second opening, and the sleeve being folded to form a first substantially rectangular end to close off the first opening and a second substantially rectangular end to close off the second opening, the first rectangular end and the second rectangular end consist of flaps formed by cutting the sleeve at the respective openings to be closed.

2. The dunnage bag as claimed in claim 1, wherein the flaps at one of said ends are folded towards each other to close off the respective opening.

3. The dunnage bag as claimed in claim 2, wherein the flaps at said one end are glued to each other to permanently close off the respective opening.

4. The dunnage bag as claimed in claim 1, wherein said bag is provided with one to six layers of said sleeves.

5. The dunnage bag as claimed in claim 1, wherein the inflatable bladder is made of polyethylene.

6. The dunnage bag as claimed in claim 1, wherein the inflatable bladder is provided with an inflation valve.

7. The dunnage bag as claimed in claim 6, wherein the inflation valve protrudes at one of the openings.

8. The dunnage bag as claimed in claim 1, wherein said bag is adapted for use in voids larger than 12 inches.

9. The dunnage bag as claimed in claim 8, wherein the voids are smaller than 40 inches.

10. The dunnage bag as claimed in claim 1, wherein said bag is substantially rectangular in shape.

11. The dunnage bag as claimed in claim 1, wherein said bag is disposable.

12. The dunnage bag as claimed in claim 1, wherein at least 50% of its exterior surface area is adapted to be in contact between two loads.

13. The dunnage bag as claimed in claim 1, wherein at least 50% of its exterior surface area is adapted to be in contact between a load and a support.

* * * * *